United States Patent [19]

Meyer

[11] 3,791,631
[45] Feb. 12, 1974

[54] METHOD AND APPARATUS FOR MAKING COLORED EXPANDED FOAM ARTICLES

[75] Inventor: Maurice J. Meyer, St. Paul, Minn.
[73] Assignee: MM Industries, Inc., St. Paul, Minn.
[22] Filed: Feb. 17, 1972
[21] Appl. No.: 227,230

[52] U.S. Cl. ................ 259/8, 23/252 R, 264/76
[51] Int. Cl. ................................ B01f 7/24
[58] Field of Search ........ 222/132; 259/7, 8, 23, 24, 259/43, 44; 23/252 R, 285, 252 A; 264/76, 73

[56] References Cited
UNITED STATES PATENTS

| | | | |
|---|---|---|---|
| 3,141,865 | 7/1964 | McEvoy | 259/8 |
| 3,171,721 | 3/1965 | Strathearn | 23/252 |
| 3,220,801 | 11/1965 | Rill | 23/252 |
| 3,607,124 | 9/1971 | Zippel | 259/8 |
| 3,675,903 | 7/1972 | Harper | 259/8 |

Primary Examiner—Robert W. Jenkins

[57] ABSTRACT

Colored expanded polyurethane foam articles are made by simultaneous discharging of measured amounts of isocyanate A, a suitable resin B, and a color pigmented liquid C into a mixing chamber in which is situated a rapidly rotating mixer. The mixed charge resulting flows by gravity into the lower section of an article mold. A mating upper section has a bleed hole through the top and is clamped onto the lower section until the resulting foam has risen and set. The mold sections are unclamped and the article ejected from the lower mold section by striking on an ejector pin slidably mounted in the bottom of the lower mold.

Apparatus for mixing and delivering this charge of urethane foam to the mold typically includes a mixing head to simultaneously deliver the two liquids A and B to the mixing chamber to be mixed and discharged into a mold. By simultaneously adding the color pigmented liquid C to this chamber through a supply conduit and the mixing head, a uniformly colored charge can be obtained. To change colors, only the supply conduit for liquid C is detached, the head flushed out and a second supply conduit C is attached to the head.

2 Claims, 8 Drawing Figures

METHOD AND APPARATUS FOR MAKING COLORED EXPANDED FOAM ARTICLES

BACKGROUND OF THE INVENTION

This invention has relation to the production of expanded foam articles by mixing several different chemicals and pouring the mixture into a closed mold, the expanded foam completely filling the mold and taking on the shape of the cavity therein. Such a process requires: (1.) accurate metering so that the charge to each mold expands to substantially exactly fill the mold cavity, (2.) efficient mixing to obtain uniform composition and coloring throughout the molded article, and (3.) accurate temperature control, while (4.) avoiding both air and water contamination.

In order to get completely uniform coloring throughout the molded article, it has been the practice to incorporate the color pigment into a suitable resin B to mix this resin with the isocyanate A. Typically, these ingredients are mixed in a one-to-one ratio in a mixing chamber opening to a nozzle which deposits the charge into the mold. The foaming action begins immediately and will, desirably, take place substantially entirely within the mold.

Often, as in the production of games in which a number of identical pieces are made of different colors, it is desirable to change the color of the pieces being produced through a particlar mixing chamber and nozzle after a relatively small number of pieces has been run. This necessitates having on hand a number of bulk supply tanks of the resin, each with its own colored pigment incorporated therein. Further, it necessitates changing these supply tanks every time there is to be a change in the color of the article being produced; necessitates running a solvent or other cleaning solution through all of the lines from the supply tank, through the metering device and an injector assembly including a mixing head, the mixing chamber and nozzle to remove all traces of the colored resin solution B; and even then losing the initial article(s) molded as the resin solution B carries the solvent solution out of these lines, devices and assemblies.

Another undesirable feature of this method of operation is the lack of control and/or variability of, the particular color shade desired. For example, according to the practices of the prior art, there will tend to be a slight variation in the color between batches of parts made with one tank of color resin solution B and the next tank, even though presumably having exactly the same shade and color.

In the production of expanded foam articles by mixing chemicals and immediately introducing the mix into the molds, it is necessary either that the injection assembly be movable to deposit the charge into the relatively stationary molds or that the molds be moveable past a stationary injector assembly. Moving of the injector assembly is compatible with accurate control over the metering of the chemicals being discharged through the nozzle because of the bulk and cumbersome form of the metering and chemical supply apparatus. Because the foaming action begins, typically, in a matter of seconds, it is desirable that the mold, once it has received its charge, be situated at a permanent attitude almost immediately. Typically a hole is provided through the mold to allow discharge of air as the foam expands, and the attitude of the mold should be such that this hold is substantially at the top of the mold.

The method and apparatus of the present invention overcome the difficulties and objections of the prior art and meet the criteria set out above.

SUMMARY OF THE INVENTION

Colored expanded foam articles are made by mixing three liquids: Isocyanate, resin, and a color pigmented liquid; and charging the mixture into a mold.

An injector assembly includes a mixing head provided with downwardly opening passages therethrough for each of the three liquids which make up the charge to the mold. Conduits extend to the outside of the mixing head from sources of each of the liquids under pressure by way of metering devices. Also provided is a fourth downwardly opening passageway which can selectively be connected to a cleaning solvent and a source of air under pressure. A nozzle base of the injector assembly provides a mixing chamber directly below the mixing head openings, and the mixer is rotatably mounted in the mixing chamber. The bottom of the mixing chamber opens to a vertical nozzle passageway through the nozzle base for discharge of the mixed charge into the mold.

An endless conveyor having one leg thereof passing by the vertical nozzle base in adjacent relation thereto includes a plurality of vertical hanger wires each separately supporting the C-frame of a mold clamp for free swinging suspension under the force of gravity. The lower section of each mold has an ejector pin slidably mounted in the bottom thereof and resilient means normally positions the pin outwardly from the mold.

The bottom leg of each C-frame is slotted to receive the ejector pin and to support the lower section of the mold.

A mating upper mold section is designed to be fastened onto the lower mold section by the use of a quick release clamp mounted in the upper leg of the C-frame.

As the C-clamps move pass the injector assembly with their clamps released, each lower mold portion is manually held in direct vertical alignment beneath the nozzle, a charge of chemicals introduced into it, an upper mold section placed on the lower, the two positioned in a C-clamp and clamped together by the quick release clamp. The conveyor then proceeds. After each mold has traveled with the conveyor long enough so that the article within is foamed and set, the quick release clamp is released, the mold removed from the C-clamp, and the ejector pin is struck a sharp blow to separate the article from the lower portion of the mold.

When the desired number of articles of a particular color has been made, the conduit from the source of color pigmented liquid under pressure is removed, the injector assembly mixing chamber and nozzle passageway are cleaned out by the introduction of the solvent and then air through the fourth mixing head passageway, and a color pigmented liquid of the next color is attached through a provided conduit to the mixer head.

DESCRIPTION OF PREFERRED EMBODIMENT

INGREDIENT MIXING AND DISPENSING STRUCTURE

An injector assembly 10 includes a nozzle 12, a nozzle base 14 providing a mixing chamber 16, a feed valve drive section 20, and a mixer drive section 22. These elements as well as the drive motor 24, control box 26, relay box 28 are supported in any convenient manner such, for example, as by ceiling hanger rod 32.

Also supported on hanger rods 32 is an endless conveyor 34, the specific construction of which forms no part of the present invention. It is sufficient to the understanding of the invention to say that an endless conveyor string 36 is powered by a means, not shown, to move a plurality of hanger tabs 38 around through split conveyor pipe 40. Each of these tabs 38 is provided with an opening 39 through which a mold clamp hanger wire 42 depends.

Figures 2, 3:
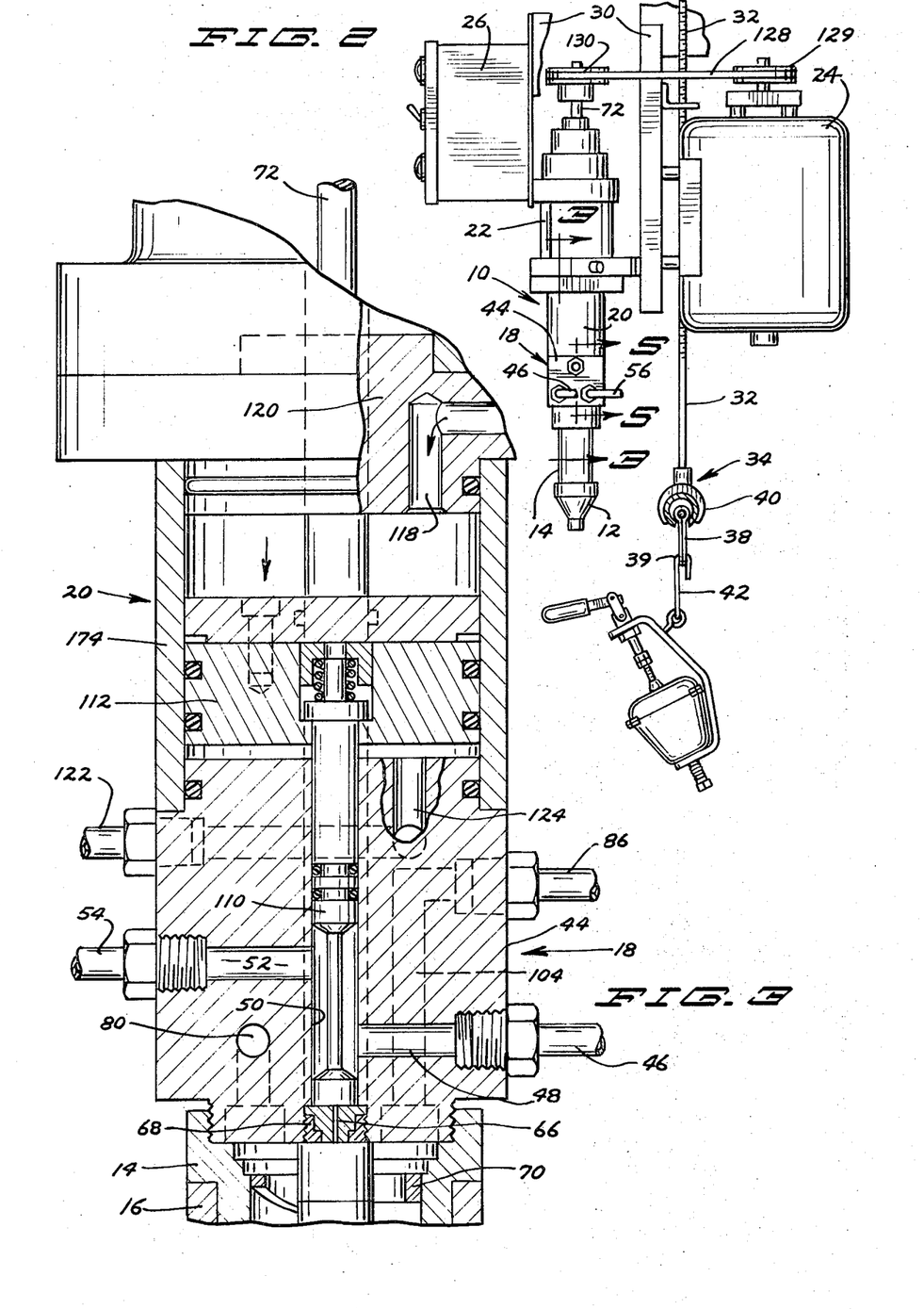
FIG. 2 is a side elevational view at reduced scale of some of the apparatus of FIG. 1.
FIG. 3 is an enlarged vertical sectional view taken on the line 3 — 3 in FIG. 2.
Figures 4, 5, 6:
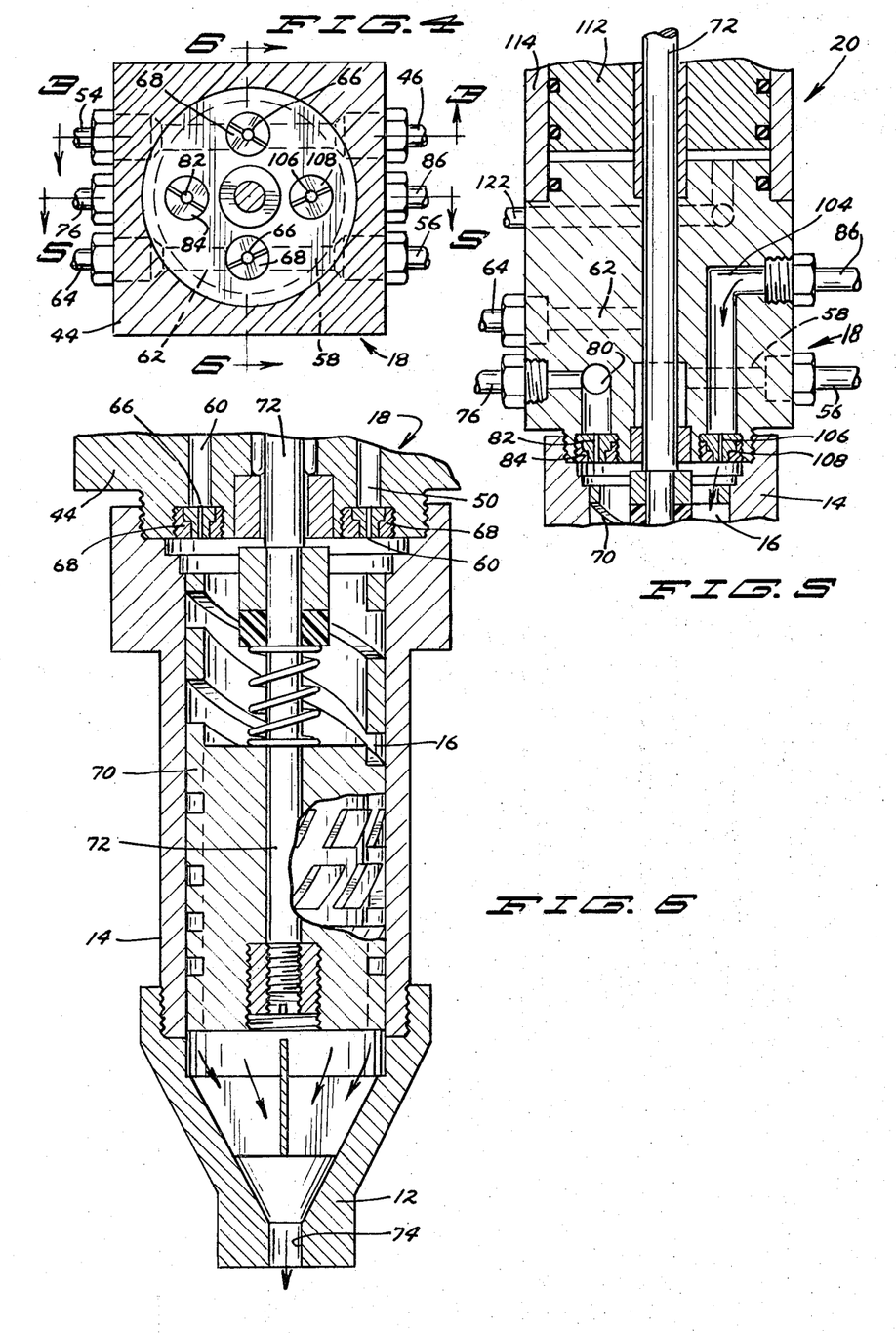
FIG. 4 is an enlarged horizontal vertical sectional view taken on the line 4 — 4 in FIG. 1.
FIG. 5 is an enlarged vertical sectional view taken on the line 5 — 5 in FIG. 2.
FIG. 6 is an enlarged vertical sectional view taken on the line 6 — 6 in FIGS. 1 and 4.

As best seen in FIGS. 3 and 4, isocyanate liquid A circulates through a mixing head 44 of the mixing head assembly 18 when the injector assembly 10 is not delivering a charge to a mold. This circulation takes place through an inlet conduit 46 from a source of isocyanate liquid A (not shown), through inlet passageway 48, through liquid A valve cylinder 50, outlet passageway 52, and through outlet conduit 54 back through a suitable pump and to the source of liquid A (not shown). Similarly, the liquid resin B circulates through the mixing head 44 from suitable pumps and a source (not shown) through inlet conduit 56, inlet passageway 58, liquid B valve cylinder 60, outlet passageway 62 and outlet conduit 64 back to he pump and source until such time as the charge is to be fed through the injector assembly and into the mold.

The nozzle base 14 is threadably mounted directly below the mixing head 44, and each of the valve cylinders 50 and 60 are defined by, and extend vertically downwardly through the bottom of, the mixing head 44, and are open to the mixing chamber 16 provided in the nozzle base through orifices 66 provided in plugs 68. The mixing chamber is cylindrical in configuration, and this cylindrical space is substantially completely filled by a cross baffle mixer 70 which is mounted on a mixer drive shaft 72 which extends upwardly through the mixing head 44, the feed valve drive section 20 and into the mixer drive section 22.

The nozzle 12 is threadably mounted on the nozzle base 14 at the bottom thereof, and receives the mixed charge from the mixing chamber so that it can be discharged outwardly through nozzle orifice 74 into a mold.

Figure 1:
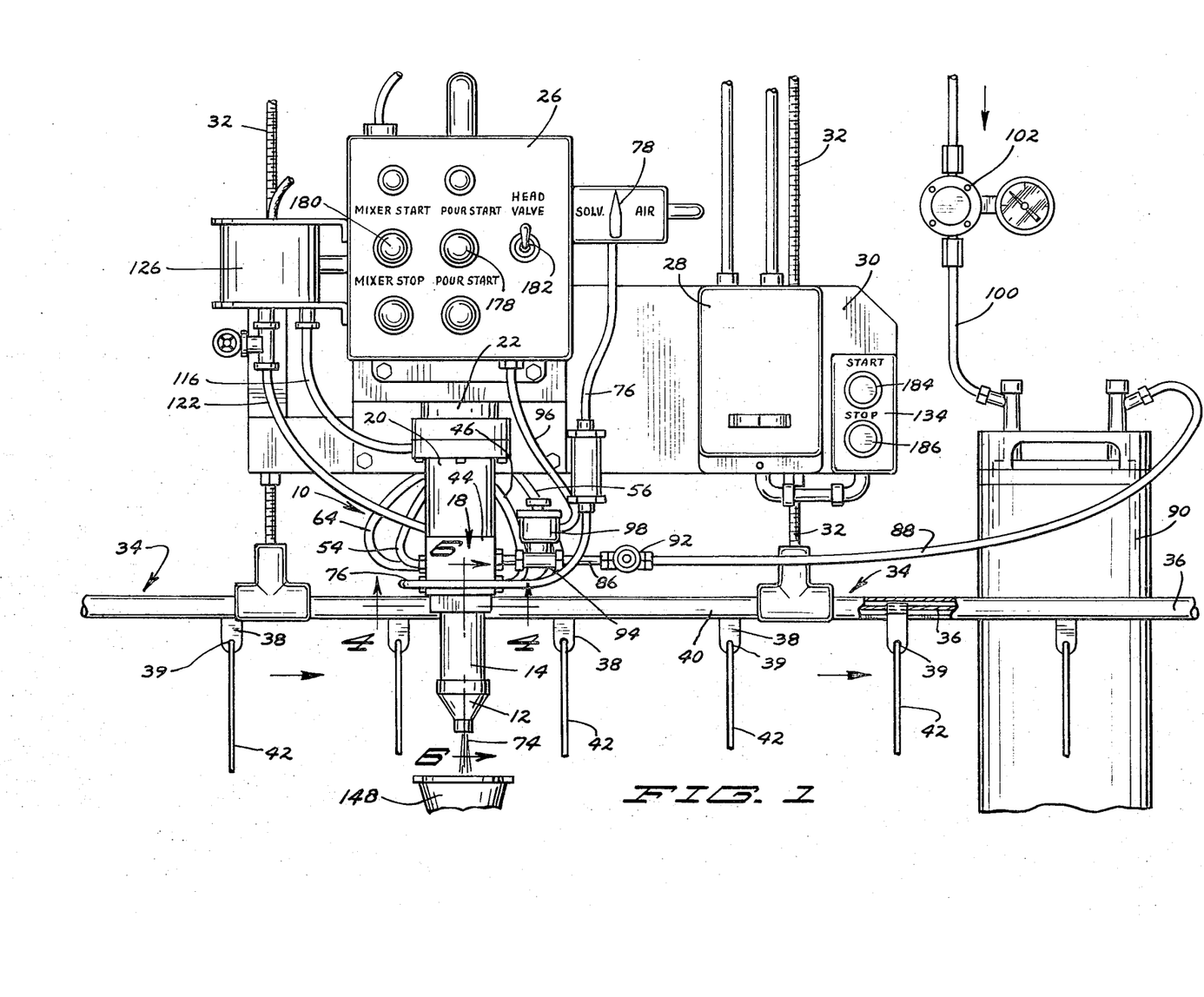
FIG. 1 is a front elevational view of apparatus made according to the present invention.

As best seen in FIGS. 1, 4 and 5, a cleanout conduit 76 extends from a manually operable control valve 78 to a cleanout passageway 80 which extends through mixing head 44 to discharge through orifice 82 and plug 84 into the mixing chamber 16.

The cleanout passageway and the inlet and outlet passageways for liquids A and B, together with the valve cylinders 50 and 60 and the subsequently to be described valving and mixer drive are all known, are all commercially available, and all individually form a part of the prior art.

As pointed out above, typically, in accordance with the teachings of the prior art, colored expanded foam articles are obtained by constituting one of the constituents in resin liquid B as a coloring constituent. This has proved at least partially satisfactory in single color runs, but where it is necessary or desirable to make a limited number of identification foam articles in different colors, this has proved most unsatisfactory, inasmuch as it is necessary to replace the entire supply of the circulating resin liquid B with another such liquid of the new color. Also, it is necessary that the circulating pump (not shown) and all of the conduits and passageways 56, 58, 60, 62 and 64 be flushed out until no trace of the old color remains, or if this is impossible, that portions of the conduits, for example, be actually replaced.

In the apparatus of the present invention, however, an additional conduit to the mixing head and an additional passageway through the mixing head are provided. Colored liquid conduit 86 extends from a lead-in hose 88 which is connected to a container 90 filled with colored liquid C. A manual valve and coupling 92 detachably connect the lead-in hose 88 with the colored liquid conduit 86. A remotely operated "on-off" valve 94 is present in the line 86. This valve is opened by appropriate controls 96 extending from control box 26 and is closed by the adjustable timing mechanism or timer 98.

When the apparatus is in operation, air, from a source of pressure not shown, is introduced into the top of the colored container 90 through an air supply hose 100, and the pressure is regulated as at 102 to be maintained constant to insure constant feed of colored liquid into the mixer head. This feed is accomplished through a colored liquid passageway 104 in the mixing head 44 which is open to colored liquid conduit 86, and opens through an orifice 106 in plug 108 and into mixing chamber 16.

This it will be seen that while the constituents of isocyanate liquid A and the resin liquid B are such that they must be constantly circulated between the supply and pumps, not shown, and through the conduits and the passageways in order to be effective after they are mixed in the mixing chamber, it is possible to constitute colored liquid C of ingredients that don't have to be recirulated at least during the short period of time that a particular run of a particular color is being made. "Contamination" of the circulating pumps and main supply by the colored constituent is, then, avoided by the apparatus of the present invention. The method of the present invention in introducing the colored liquid constituent to the isocyanate and resin constituents in the mixing chamber has been found to be an effective way to produce uniformly colored, high quality, expanded foam articles.

When the colors are to be changed, the pressure normally entering the colored container 90 through the air supply hose 100 is relieved, and the valve-coupling 92 is detached to allow colored lead-in hose 88 and the container 90 to be replaced with another container 90 having a different colored liquid C therein and with another lead-in hose 88, the interior of which is "contaminated" with the new color. In accordance with a method to be explained more fully later, solvent and then air are introduced through the cleanout conduit 76 while the colored liquid conduit 86 is detached. With the mixer 70 being rotated, the solvent and then air will clean and scrub out the mixing chamber and the nozzle. By plugging the nozzle orifice 74, solvent and air can be caused to discharge backwards through the colored liquid conduit 86 to clean out both it and the interior of the on-off valve 94. The air blast tends to dry out and clean out all traces of the liquids A, B and C, so that when the new colored container 90 and lead-in hose 88 are connected, even the first charge of liquids into the mixing chamber and consequently the first article formed will have uniform and perfect coloration.

For clarity and understanding the invention, the valving of liquids A and B will now be described and the drive for the cross baffle mixer 70 will be indicated.

Slideably mounted in the liquid A valve cylinder 50 is a valve spool 10 connected to an air operated piston 112 operably mounted in a feed valve drive cylinder 114, defined by the housing for the feed valve drive section 20.

A recirculate control air intake hose 116 extends through an upper air passageway 118 and cylinder head 120 which also forms a part of feed drive section 20. A liquid feed control air intake hose 112 is open to a lower air passageway 124 through the mixing head 44 into the lower end of the cylinder 114. These feed valve control air intake hoses 116 and 122 extend from a fluid valve 126 which is controlled through appropriate controls from the control box 26 to pressurize air intake hose 116 when the liquids A and B are to be recirculated and to pressurize intake hose 122 when these liquids are to be charged into the mixing chamber 16.

As best seen in FIG. 5, the mixer drive shaft 72 extends up through the center of the feed valve drive section 20 including the air operated piston 112. The shaft 72 is driven by drive belt 128 and pulleys 129 and 130 from the drive motor 24. The drive motor is controlled from the control box 26 by "mixer start and stop" switch 180.

In addition to valve spool 110 in liquid A valve cylinder 50, the air operated piston 112 also carries a simiar valve spool operating in the liquid B valve cylinder 60. As will best be seen from FIG. 3, when the liquids A and B are to be recirculated, the air pressure in air hose 116 and upper passageway 118, acting on the top of piston 112, will position the valve spool 110, as seen in that figure, and will allow liquid A to circulate in through conduit 46 and out through conduit 54. At the same time, liquid B will be circulating in through the conduit 56 and out through the conduit 64.

When it is desired that a charge of the chemical constituents for making the expanded foam articles be transmitted to a mold, air will be introduced into liquid feed control air intake hose 122, and the pressure will be relieved in the recirculate control air intake hose 116. This causes the piston 112 to move in an upward direction, sealing off the outlet conduits 54 and 64, but allowing flow in through conduits 46 and 56, and through orifices 60 and plugs 68 to the mixing chamber 16.

At the same time, the appropriate controls 96 will activate the fluid on-off valve 94, allowing the colored liquid C to be fed under pressure through the conduit 86 and colored liquid passageway 104 in mixing head 44, and through orifice 106 into the mixing chamber 16. When the predetermined amount of liquids A and B have been transmitted into the mixing chamber, the air pressure in air hoses 116 and 122 will be reversed to cut off the feed of the liquid and to again institute recirculation. The adjustable timer 98 will be preset to cause the valve 94 to be closed when sufficient amounts of the colored liquid C has been discharged into the mixing chamber.

These three liquids, under the action of the rapidly rotating cross baffle mixer 70 in the mixing chamber 16, will substantially instantaneously cause the three liquids to be completely and uniformly mixed together, and to be charged out of the nozzle orifice 74.

MOLD AND CONVEYOR STRUCTURE

As stated above, an endless conveyor includes an endless conveyor string, chain, or other usual or preferred continuous loop powered by a drive motor mechanism (not shown) to cause conveyor tabs 38, hanging out below a split bottomed conveyor pipe 40 to move continuously when the conveyor has been activated by the "Start-Stop" conveyor switch 134 operatively connected to the conveyor drive through relay box 28. As stated above, mold clamp hanger wire 42 hangs through the openings 39 in each of the conveyor tabs 38. Hanging from each hanger wire 42 by a hookeye 136 is a C-frame 138 made up of an angled base leg 40, an integral, outwardly extending lower leg 142 and an integral, outwardly extending upper leg 144 parallel with the lower leg.

The lower leg 142 is split at its outer end to receive an ejector pin assembly 146 of a lower mold section 148 of a mold 150. The upper leg 144 of the C-frame is provided with an opening 152 to receive a clamp rod 154 of a clamping assembly 156.

The mold 150, as shown, is of a shape to form an article useful in playing a game. Obviously the mold used in connection with the invention will be of whatever shape is necessary to form the desired article. Typically, as shown herein, the lower mold section 148 will be hollow and will be designed to meet with an upper mold section 158 in alignment with the maximum transverse cross section of the finished molded article. Aligning pins and matching holes can be provided in the two molds, or any other suitable device such as the bumps and depressions shown at 160 in FIG. 8 can be used to assure proper register of the lower and upper molds with respect to each other.

Figures 7, 8:
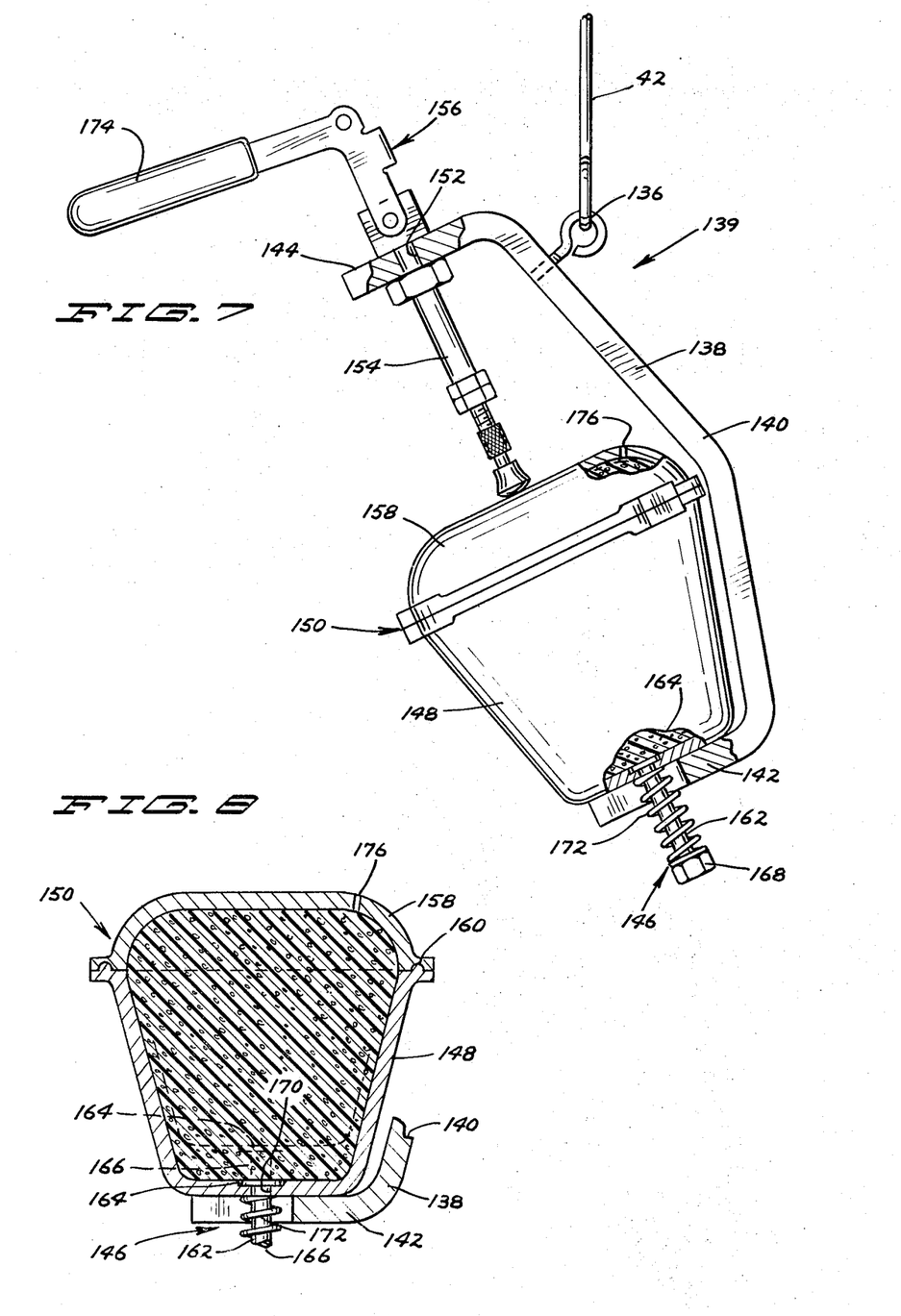
FIG. 7 is an enlarged side elevational view of a C-frame mold clamp and mold as seen in FIG. 2.
FIG. 8 is a vertical sectional view of the mold and a portion of the C-frame of FIG. 7 with an expanded foam article in the mold.

As seen in FIGS. 7 and 8, the wall of the lower mold section 148 opposite the surface that mates with upper section 158 is provided with an ejector pin 162 forming part of the ejector pin assembly 146. This ejector pin includes an ejector plate 164 constituted as an integral upper end portion of the pin 162, and a shank 166 extendng from the ejector plate to an end nut 168 suitably affixed on the opposite end thereof. An opening 170 is provided in the bottom wall of the lower mold section 148 and includes a recess for receiving the ejector plate so that the bottom wall and ejector plate will be flush and so that the shape of the ejector plate will not appear on the finished article. A compression coil spring 172 exerting pressure between the bottom wall of the lower mold section 148 and the end nut 168 complete the ejector plate assembly 148.

Upper mold section 158 is held in place, during the rising and curing of the expanded polyurethane foam, by clamp rod 154 which is adjustable in length to the end that with the clamp operating handle 174 in the position as seen in FIG. 7, the rod 154 will firmly hold the two mold sections together. The structure of the clamping mechanism can be of any usual or preferred design, forming no part of the invention, to the end that when handle 174 is rotated approximately 90° in the clockwise direction as seen in FIG. 7, the rod 154 will be carried clear of the upper mold section.

In FIG. 7, the approximate angle of the C-frame clamp and the mold are shown as they would be supported on the hanger wire 42 when the mold is filled with expanding and foaming polyurethane. In order to allow escape of the air trapped in the mold when the mold sections are assembled, a mold vent 176 is provided at approximately the uppermost point on the upper mold section.

OPERATION

To start up the operation of the apparatus, the "Pour Start" switch 178 is used to activate the circulation of isocyanate liquid A and the resin liquid through the system including the appropriate passageways in the mixing head 44. "Mixer Start" switch 180 is activated to energize mixer drive motor 24 to cause mixer 70 to be rotated in mixing chamber 60. In describing this start up procedure, it will be assumed that the mixing head passageways and cylinders are all clean of any residual traces of isocyanate liquid A, resin liquid B and colored liquid C, and that each of the tabs 38 in the endless conveyor system supports a hanger wire 42 which carries a C-frame mold clamp assembly 139; and that the molds are all empty.

With the direction of movement of the endless conveyor to the right as seen in FIG. 1, each mold clamp 139 adjacent and "upstream" of injector assembly 10 will open. The lower mold section 148 will be held in an upright position, as shown under the nozzle in FIG. 1, the "Head Valve" switch 182 will be momentarily activated to institute operation of the controls which cause a reversal of the air pressures in recirculate control air intake hose 116 and liquid feed control air intake hose 122. This will cause air entering through lower air passageway 124 to cause air operated piston 112 to move to its upward position carrying the valve spool 110 in liquid A valve cylinder 50 and the valve spool in liquid B valve cylinder 60 to cut off access of the liquids to the respective outlet passageway and thus to cause those liquids to be metered, instead, through orifices 66 into the mixing chamber 16 where they will come into action by the mixer 70. Simultaneously, operation of head valve switch 182 will, acting through appropriate controls 96, institute flow of colored liquid C through "on-off" valve 94, thus adding the colored constituent to the mixing head at the same time and causing the color to be mixed homogeneously and uniformly with the other two liquids A and B. As shown, the timer 98 will cause cutoff of this color fluid C at the proper point, but it is to be understood that this cutoff could also come from other internal controls to be simultaneous with the cutoff of the flow liquids A and B, which will happen when precisely enough of the three liquids has been injected through the injector assembly to result in the complete filling of the mold after the liquids have foamed and expanded.

Before this foaming action takes place, or at least before it has gotten near the top of the lower mold 148, the upper mold 158 is put in place on the lower mold 148, both positioned in a mold clamp 139 and the clamping assembly 156 activated to hold the two mold halves together. When the operator lets go of the mold and the mold clamp 139, the parts will come to rest by gravity in position substantially as seen in FIG. 7.

At this point, the "Start" button 184 will have been activated to cause the conveyor mechanism to be operative to move each of the molds 150 and mold clamp assemblies 139 slowly to the right as seen in FIG. 1.

Because of the relatively slow movement of the conveyor 34, and because of the length of the conveyor line itself, each mold will maintain its alignment with the vertical throughout the time that it takes the chemicals to foam and to set. An operator at a station (not shown) can then deactivate the clamping assembly to release the clamp rod 154 from the top of the upper mold section 158. He will then remove the mold from the clamp and strike or otherwise forcibly move the nut 168 on the end of the injector pin to force the injector plate upwardly to position as seen in dotted lines in FIG. 8, thus effectively removing the newly formed molded article from the mold. The mold halves will then be passed to the operator adjacent the mixing head assembly where they will again be loaded and charged with liquids A, B and C.

When sufficient articles have been made with a particular colored liquid C constituent, the valve 92 will be closed to seal the pressure within the lead-in hose 88, the colored liquid conduit 86 will be uncoupled from the valve 92, and the colored liquid C allowed to drain from this conduit.

The mixing head 44 will then be cleaned out by first turning the fluid control valve 78 to the "Solvent" position to allow discharge of solvent under pressure through cleanout passageway 80 through the mixing head 44, and through orifice 82 into mixing chamber 16 where the solvent will be carried by the rotating mixer to all cranies and crevices of that mixing head and the nozzle. In order to clean out the colored liquid conduit 86, some of the solvent can be allowed to escape back through orifice 106 and colored liquid passageway 104 in the mixing head and into and through conduit 86. This will also serve to clean out the surfaces of the on-off valve 94. When the solvent has done its work in removing traces of all of the liquids from all of the exposed surfaces, the fluid control valve 78 will be reversed in position to allow air under pressure to pass through the cleanout conduit 76, thus blowing out the solvent and drying off all of the surfaces involved. A container 90 containing the colored liquid C of the next desired color and its lead-in hose 88 will be put into place, coupled with manual valve 92; the manual valve 92 coupled with the colored liquid conduit 86, the new container 90 repressured, and valve 92 opened to allow colored liquid to reach the valve 94. At this point, the process described above can be instituted, and foamed articles of the new color can be produced.

The embodiments of the invention in which an exclusive property or privilege is claimed are defined as follows:

1. In an apparatus for making colored expanded foam articles having a mixer head, a mixing chamber below said head, a mixer in said chamber, a discharge nozzle below and open to said chamber to receive the contents of said chamber, first and second supply pipes situated to deliver first and second liquids through said mixer head and into an upper portion of said mixing chamber, valve means to meter and control simultaneous discharge of said first and second liquids from said pipes, the improvement comprising:

a plurality of sources of colored third liquids each of a different hue, a third pipe extending from a first source of third liquid through said mixer head and into said chamber, adjustable valve means operative in said third pipe to permit a selected amount of said third liquid to flow into said chamber simultaneously with the delivery of said first and second liquids to said chamber, and coupling means adjacent said mixer head to permit uncoupling of said third pipe from said first source of colored liquid of a first color and coupling of said third pipe to a second source of colored liquid of a second color.

2. The combination of claim 1 and a fourth pipe through said mixer head in position to discharge directly into said chamber; and means including valve means to selectively:
 a. introduce a liquid solvent into said fourth pipe and through it into the chamber,
 b. introduce a gas into said fourth pipe and said chamber, and
 c. block all fluid flow through said fourth pipe.

* * * * *

PO-1050
(5/69)

UNITED STATES PATENT OFFICE
CERTIFICATE OF CORRECTION

Patent No. 3,791,631          Dated February 12, 1974

Inventor(s) MAURICE J. MEYER

It is certified that error appears in the above-identified patent and that said Letters Patent are hereby corrected as shown below:

Column 1, line 54, cancel "injection", insert --injector--.

Column 3, line 23, cancel "rod", insert --rods--.

Column 3, line 46, cancel "he", insert --the--.

Column 4, line 16, cancel "identification", insert --identical-

Column 4, line 48, cancel "this", insert --thus--.

Column 5, line 24, cancel "10", insert --110--.

Column 5, line 31, cancel "112", insert --122--.

Column 6, line 30, cancel "openings", insert --opening--.

Column 6, line 33, cancel "40", insert --140--.

Column 6, line 60, cancel "tendng", insert --tending--.

Column 7, line 26, after "liquid", second occurrence, insert -- B --.

Column 8, line 24, cancel "injector", insert --ejector--.

Column 8, lines 64 and 65, "fo-lows" should be --follows--.

Signed and sealed this 17th day of September 1974.

(SEAL)
Attest:

McCOY M. GIBSON JR.          C. MARSHALL DANN
Attesting Officer             Commissioner of Patents